United States Patent [19]
Weber et al.

[11] Patent Number: 5,634,868
[45] Date of Patent: Jun. 3, 1997

[54] METHOD FOR ADVANCED CRANK SPARK WITH BLEND SPARK RETARD FOR AN ENGINE

[75] Inventors: Gregory T. Weber, Commerce; Christopher P. Thomas, West Bloomfield; Kenneth P. DeGroot, Macomb Township; Gerald R. Honkanen, Davisburg; Thomas A. Larson, Bloomfield, all of Mich.

[73] Assignee: Chrysler Corporation, Auburn Hills, Mich.

[21] Appl. No.: 481,005

[22] Filed: Jun. 7, 1995

[51] Int. Cl.⁶ .................. F02P 5/15; F01N 3/20; F01N 3/24; F02D 41/06
[52] U.S. Cl. .................. 477/107; 123/406; 123/424; 60/285
[58] Field of Search .................. 123/406, 424; 60/285; 477/107, 102

[56] References Cited

U.S. PATENT DOCUMENTS

| | | | |
|---|---|---|---|
| 4,570,596 | 2/1986 | Sato | 123/424 X |
| 4,633,834 | 1/1987 | Takeuchi et al. | 123/424 |
| 4,719,573 | 1/1988 | Kissel et al. | 123/417 X |
| 5,027,771 | 7/1991 | Daikoku et al. | 123/424 |
| 5,113,827 | 5/1992 | Vincent | 123/417 X |
| 5,390,491 | 2/1995 | Suzumura et al. | 60/285 X |

FOREIGN PATENT DOCUMENTS

| | | | |
|---|---|---|---|
| 361205377 | 9/1986 | Japan | 123/424 |
| 404353267 | 12/1992 | Japan | 123/406 |
| 406017734 | 1/1994 | Japan | 123/406 |
| 406026432 | 2/1994 | Japan | 123/406 |
| 406026431 | 2/1994 | Japan | 123/406 |

Primary Examiner—Khoi Q. Ta
Attorney, Agent, or Firm—Mark P. Calcaterra

[57] ABSTRACT

A method for advanced crank spark with blend spark retard for an internal combustion engine includes the steps of selecting whether a spark in an engine cylinder will be fired on a predetermined first or second crank edge during an engine start mode, firing the spark on the second crank edge during the engine start mode if the second crank edge is selected, firing the spark on the first crank edge if the first crank edge is selected, determining whether the internal combustion engine is in the engine start mode based on engine speed, continuing to select whether to fire the spark on the predetermined first crank edge or the predetermined second crank edge if the internal combustion engine is in the engine start mode based on engine speed less than the predetermined speed, and retarding the spark from a first spark level to a hold start level at a predetermined rate, holding the spark at the hold spark level for a hold period, and advancing the spark to the first spark level at the predetermined rate, if the internal combustion engine is in the engine start mode based on engine speed greater than the predetermined speed.

10 Claims, 6 Drawing Sheets

METHOD FOR ADVANCED CRANK SPARK WITH BLEND SPARK RETARD FOR AN ENGINE

BACKGROUND OF THE INVENTION

1. Field of the Invention

The present invention relates generally to spark advance in internal combustion engines and, more particularly, to a method for advanced crank spark with blend spark retard for an internal combustion engine.

2. Description of the Related Art

Environmental concerns have prompted government regulations to curb emissions from sources such as internal combustion engines in motor vehicles. For instance, the Clean Air Act of 1990 regulates maximum levels of hydrocarbons, carbon monoxide and oxides of nitrogen that may be emitted from a tailpipe of the motor vehicle. Also, California, because of its unique climate, has enacted its own stringent regulations.

In the motor vehicle, a catalytic converter is used for decreasing emissions from the engine before the exhaust gases exit through the vehicle's tailpipe. One technique for reducing emissions is to utilize a leaner air/fuel ratio, however, starting a cold engine requires a richer air/fuel ratio until the engine warms up. Another technique for reducing emissions is to increase the spark advance, but this is not always feasible during engine cranking. Therefore, there is a need in the art to provide a method of advancing the spark and then retarding the run spark to reduce emissions from the engine as soon as possible after the engine starts.

SUMMARY OF THE INVENTION

It is, therefore, one object of the present invention to provide a method for advanced crank spark for an internal combustion engine.

It is another object of the present invention to maintain engine idle speed quality while advancing engine spark.

To achieve the forgoing objects, the present invention is a method for advanced crank spark with blend spark retard for an internal combustion engine. The method includes the steps of selecting whether a spark in an engine cylinder will be fired on a predetermined first or second crank reference edge during an engine start mode, firing the spark on the second crank reference edge during the engine start mode if the second crank reference edge is selected, and firing the spark on the first crank reference edge if the first crank reference edge is selected. The method also includes the steps of checking if an engine speed is greater than a predetermined speed, and continuing to select whether to fire the spark on the first crank reference edge or the second crank reference edge if the engine speed is less than the predetermined RPM. The method further includes the steps of retarding the spark from a first spark level to a hold start level at a predetermined rate, holding the spark at the hold spark level for a hold period, and advancing the spark to the first spark level at the predetermined rate, if the engine speed is greater than the predetermined speed.

One advantage of the present invention is that a method is provided for using an advanced crank spark for an internal combustion engine. Another advantage of the present invention is that the method has a blend spark retard feature when the engine is cold started and the vehicle is in a park or neutral mode. Yet another advantage of the present invention is that the spark advance can be retarded while maintaining engine idle quality, without inducing a sag in engine speed or affecting driveability. A further advantage of the present invention is that the method allows catalytic converter activity to increase, thereby reducing emissions from the vehicle's tailpipe. A still further advantage of the present invention is that the method allows the spark advance to be retarded sooner than conventionally done in the art.

Other objects, features and advantages of the present invention will be readily appreciated as the same becomes better understood after reading the subsequent description taken in conjunction with the accompanying drawings.

DESCRIPTION OF THE PREFERRED EMBODIMENT(S)

Figure 1:
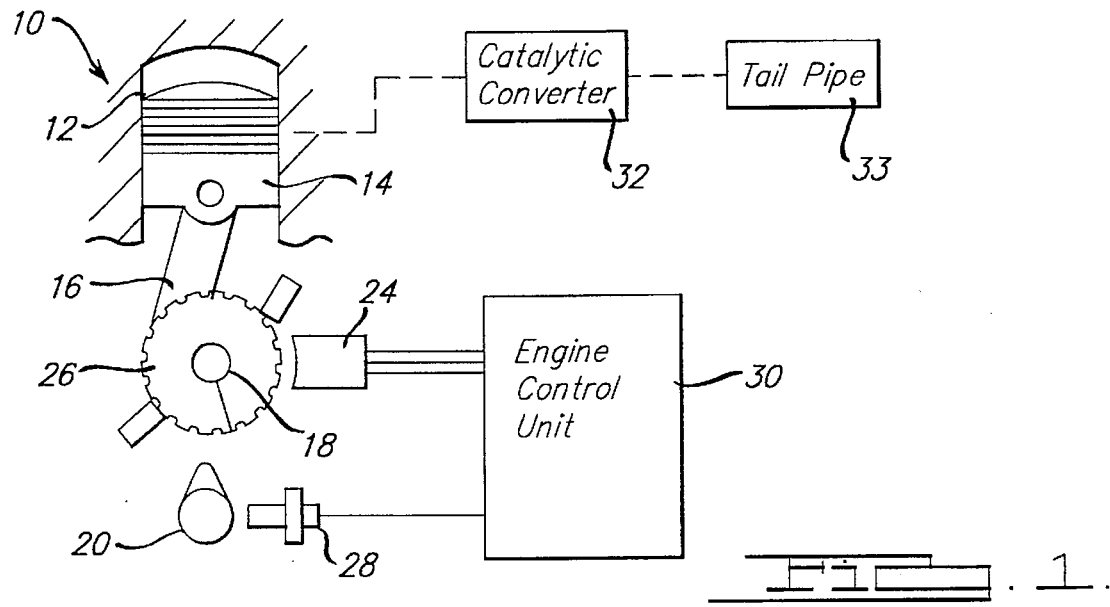
FIG. 1 is a schematic diagram of an internal combustion engine used with a method, according to the present invention, for advanced crank spark with blend spark retard.

Referring to FIG. 1, an internal combustion engine 10 is partially shown, illustrating one of a multiple of cylinders 12 in the engine 10. The engine 10 includes a piston 14 disposed within the cylinder 12 and operatively connected by a connecting rod 16 to a crankshaft 18 of the engine 10. The engine 10 includes a camshaft 20 to open and close at least one valve (not shown) of the cylinder 12 for various strokes of the piston 14. In a four stroke spark-ignited (SI) internal combustion engine, these strokes include intake, compression, expansion and exhaust. The engine 10 also includes a crankshaft sensor 24 and a crankshaft sensor target 26, having at least one, preferably a plurality of trip points, operatively connected to the crankshaft 18 in communication with the crankshaft sensor 24. The engine 12 includes a camshaft sensor 28 in communication with the camshaft 20. The outputs of sensors 24 and 28 communicate with an engine control unit, generally indicated at 30, of the engine 12. The engine control unit 30 utilizes the outputs of sensors 24 and 28 to determine the position of the piston 14 within the cylinder 12. As the piston 14 reaches an upper limit of its stroke, the piston 14 is motionless or dead, before the direction of its motion is reversed. This position is referred to in the art as top dead center (TDC) or 0°. Proceeding counterclockwise, the position of the piston 14 is referenced in degrees before top dead center (BTDC). It should be appreciated that the engine 10 includes a spark plug (not shown) for the cylinder 12 and is signaled when to fire by the engine control unit 30.

Preferably, the engine 10 includes various sensors such as a Manifold Absolute Pressure (MAP) sensor, speed sensor, temperature sensor or speed sensor which are not shown, but well known in the art and are located relative to the engine 10 as is known in the art. The outputs of the various sensors communicate with the engine control unit 30.

During an exhaust stroke of the engine 10, exhaust gases flow from the cylinder 12 via a valve through a catalytic converter 32 and out a tailpipe 33. Although the engine 10 is a four stroke spark-ignited (SI) internal combustion engine, it may also be other types of internal combustion engines, such as a two stroke SI engine or a diesel engine. It should be appreciated that the catalytic converter 32 and tailpipe 33 are conventional and known in the art.

Figure 2:
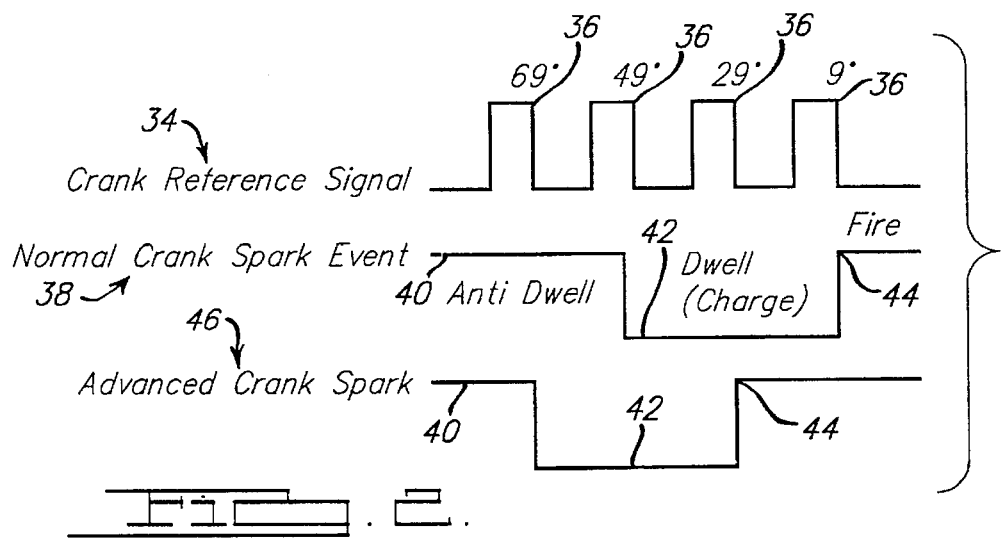
FIG. 2 is a diagram illustrating a normal crank spark event relative to an advanced crank spark event for the internal combustion engine of FIG. 1.

Referring to FIG. 2, a normal crank spark event relative to an advanced crank spark event in the internal combustion engine 10 is shown. The output of the crankshaft sensor 24 is represented as the crank reference signal 34 and represents a number of degrees BTDC 36. In this example, a predetermined number of degrees BTDC such as 9° BTDC, 29° BTDC, 49° BTDC and 69° BTDC are the reference points used. A normal crank spark event is shown at 38. The components of the normal crank spark event 38 include anti-dwell period 40, dwell period 42 and fire point 44. Anti-dwell 40 refers to the period preceding the dwell period 42. The dwell period 42 is the time required to charge an ignition coil (not shown) of the engine 10. The charged ignition coil initiates a firing event at the fire point 44. It should be appreciated that, in this example, the spark plug initiates the firing event at 9° BTDC. Also, in this example, the dwell period 42 requires 40° relative to the movement of the crankshaft 18 and is initiated at 49° BTDC.

For an advanced crank spark event 46, according to a method of the present invention to be described, the firing point 44 is at a predetermined number of degrees BTDC such as 29° BTDC and the dwell period 42 is initiated at a predetermined number of degrees BTDC such as 69° BTDC. By advancing the firing point 20°, the burn rate speeds up, resulting in more complete combustion and lower emissions of the engine 10.

Figure 3:
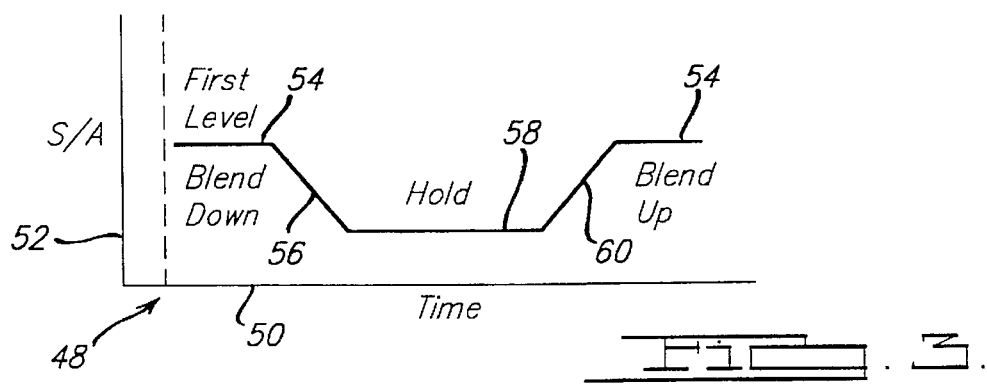
FIG. 3 is a graph of time vs. spark advance illustrating the blend spark retard feature of the method for advanced crank spark, according to the present invention.

Referring to FIG. 3, a graph 48 of time vs. spark advance for the engine 10 illustrates a blend spark retard feature of a method, according to the present invention, for advanced crank spark to be described. In the graph 48, the blend spark retard feature becomes active after the engine start to engine run transfer point is attained and remains active as long as a transmission (not shown) of the motor vehicle remains in a park/neutral mode. For example, the engine start to engine run transfer point may occur when the engine speed reaches 600 rpm for the engine 10.

In the graph 48, the x-axis 50 represents time and the y-axis 52 represents spark advance. The spark advance is initially held at a predetermined first level 54 for a period that may be based on a length of time or an event such as the cylinder 12 position. During a blend down portion 56, the spark advance is reduced to a predetermined hold level 58 at a predetermined rate. The predetermined rate is chosen so that engine speed is not affected and the change in spark advance is imperceptible to a driver of the motor vehicle. The predetermined hold level 58 of spark is maintained for a predetermined period of time. At the end of this predetermined period, the spark advance has a blended up portion 60 to the first level 54 at the predetermined rate. Again, it is desirable that the change in spark advance be impervious to the driver. The spark advance is then held at the first level 54 until the engine control unit 30 directs it otherwise. It should be appreciated that if the driver shifts the transmission into the drive mode during the blend spark retard feature, the engine control unit 30 immediately deactivates this feature and initiates typical spark advance control routines.

Figure 4:
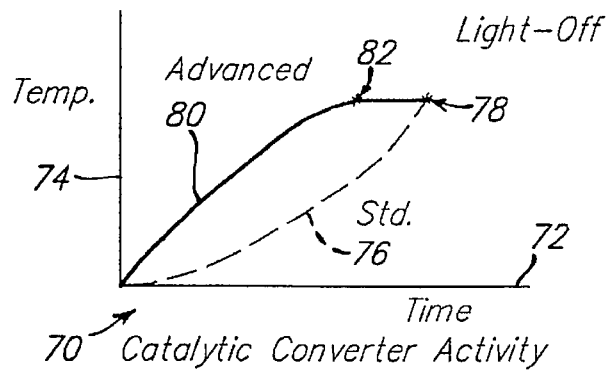
FIG. 4 is a graph of time vs. catalyst temperature when using the method, according to the present invention, for advanced crank spark with blend spark retard.

Referring to FIG. 4, a graph 70 of time vs. catalyst temperature illustrates activity for the catalytic converter 32 when the method, according to the present invention, is used for the engine 10. The x-axis 72 represents time, while the y-axis 74 represents temperature. A standard catalyst activity curve 76 illustrates a typical warming trend of the catalytic converter 32, and a standard light-off point 78. An advanced spark catalyst activity curve 80 illustrates the warming trend of the catalytic converter 32 when the method, according to the present invention, is used and the earlier advanced spark light off 82.

Figure 5A:
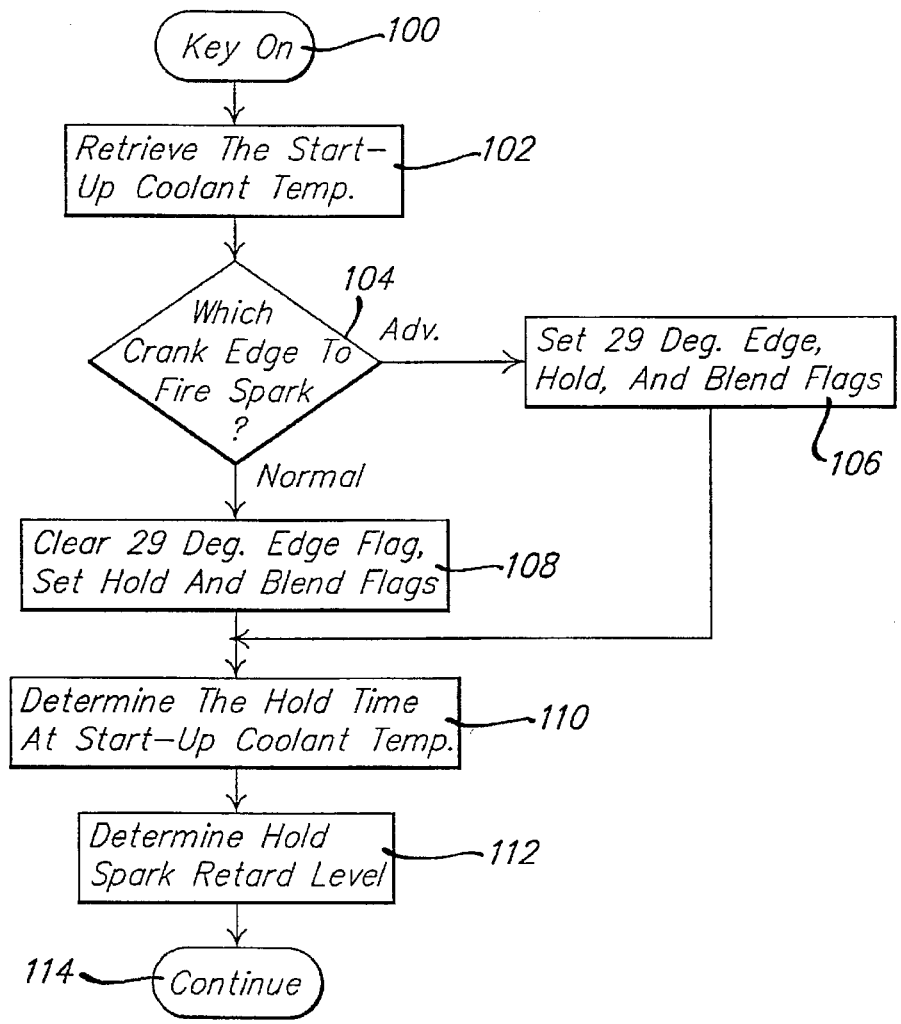
FIGS. 5A through 5G are flowcharts of a method for advanced crank spark with blend spark retard, according to the present invention, for the internal combustion engine of FIG. 1.

Referring to FIGS. 5A through 5G, a flowchart of a method, according to the present invention, for advanced crank spark with blend spark retard for the engine 10 is shown. In FIG. 5A, the methodology begins one time after the engine 10 is keyed ON in block 100 and advances to block 102. In block 102, the methodology retrieves a start-up coolant temperature by the engine control unit 30 receiving a signal from a coolant temperature sensor (not shown). It should be appreciated that the methodology is stored in the engine control unit 30.

After block 102, the methodology advances to diamond 104 and determines which crank edge to fire the spark on, e.g., the first or normal crank or the second or advanced crank edge depending on the start-up coolant temperature. If the second or advanced crank reference edge is selected, 29° for this example, the methodology advances to block 106 where the second crank edge flag is set, and appropriate flags such as hold and blend flags are set, before advancing to block 110 to be described. If the first or normal crank reference edge is selected, the methodology advances to block 108 and sets a first crank normal edge flag, 9° for this example, and other appropriate flags such as a hold and blend flags. The methodology then advances to block 110 and determines the hold period 58 based on the start-up coolant temperature. From block 110, the methodology advances to block 112 and determines the hold spark retard level based on an empirically determined spark level from a calibration table stored in memory of the engine control unit 30. The methodology then advances to block 114 where it ends and returns back to a main program of the engine control unit 30.

Figure 5B:
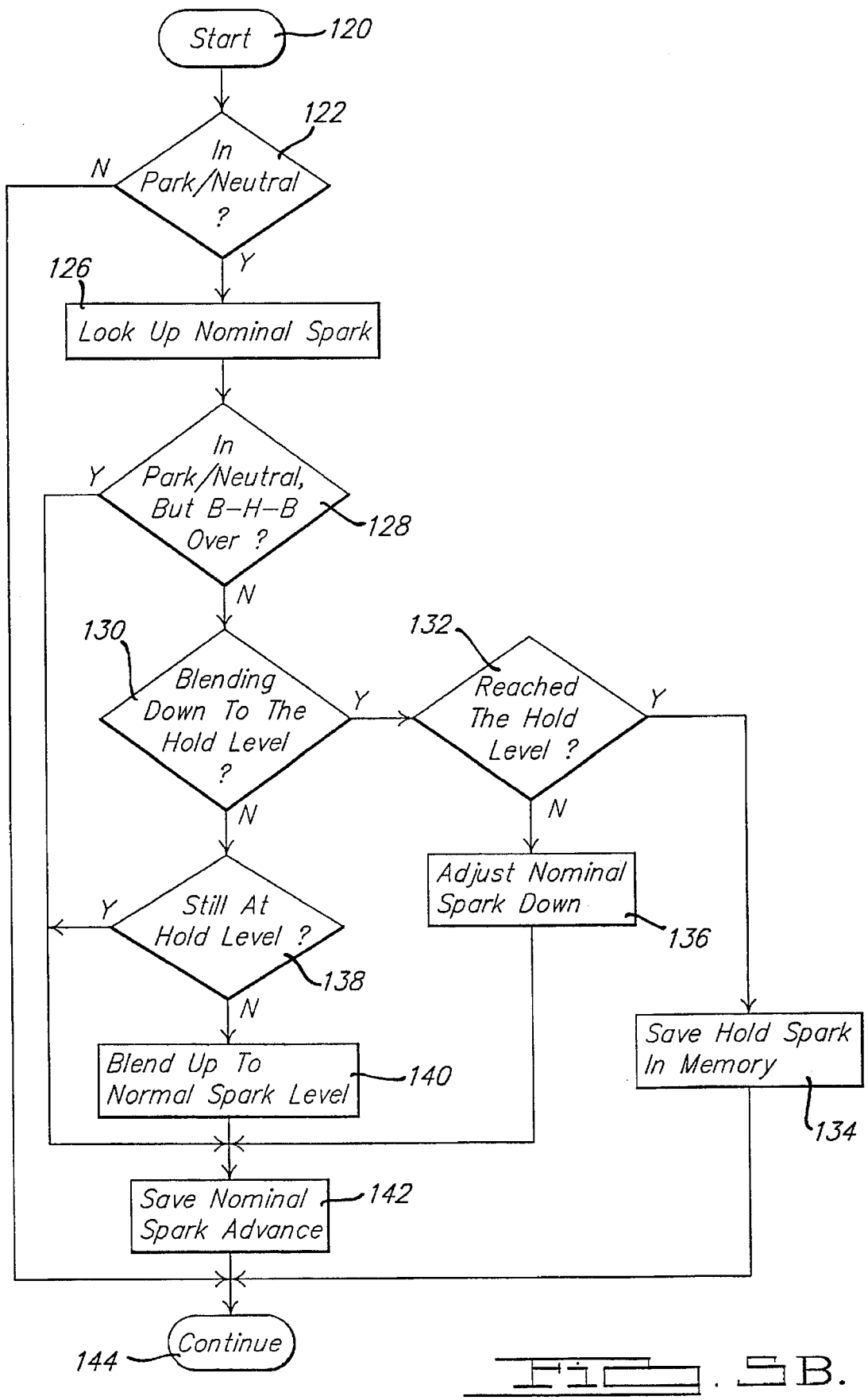

In FIG. 5B, the methodology determines the state of the blend-hold-blend routine and the spark advance is adjusted accordingly, as long as the transmission remains in a park or neutral mode. The methodology is called for periodically by the engine control unit 30 and begins in bubble 120, and advances to diamond 122. In diamond 122, the methodology determines whether the transmission is in park or neutral mode based on a signal from a park/neutral switch (not shown) on the transmission. If the transmission is not in a park or neutral mode, the methodology advances to bubble 144 to be described.

If the transmission is in a park or neutral mode, the methodology advances to block 126 and determines a nominal spark advance in park/neutral from a look-up table stored in memory of the engine control unit 30. The methodology then advances to diamond 128 and determines whether the transmission is still in the park or neutral mode but the blend-hold-blend period is over for example, by looking for a flag. If the transmission is still in the park or neutral mode and the blend-hold-blend period is over, the methodology advances to block 142 to be described.

If the transmission is still in the park or neutral mode and the blend-hold-blend period is not over, the methodology advances to diamond 130. In diamond 130, the methodology determines the state of the blend-hold-blend period by establishing whether the spark advance is currently blending down to the hold spark level. If the spark advance is blending down to the hold spark level, the methodology advances to diamond 132 and determines whether the spark advance has reached the hold level. If the spark advance has reached the hold level, the methodology advances to block 134 and clears flags such as the blend flag and stores the hold spark level in a memory location in the engine control unit 30 until required. The methodology then advances to bubble 144 to be described.

Referring back to block 132, if the spark advance has not reached the hold level, the methodology advances to block 136 and adjusts the nominal spark advance by subtracting a running blend total, to be described, from the nominal spark advance. The methodology then advances to block 142 to be described.

Referring back to diamond 130, if the spark advance is not blending down to the hold level, the methodology advances to diamond 138. In diamond 138, the methodology determines if the spark advance is still at or being maintained at the hold level. If so, the methodology advances to block 142 to be described. If not, the methodology advances to block 140 and blends the spark advance back to a normal spark level and the spark is adjusted upwards by subtracting a running blend total, to be described, from the nominal spark advance. The methodology then advances to block 142 and saves the nominal spark advance in a memory location of the engine control unit 30 until called for. The methodology then advances to bubble 144 and continues back to the main program in the engine control unit 30.

Figure 5C:
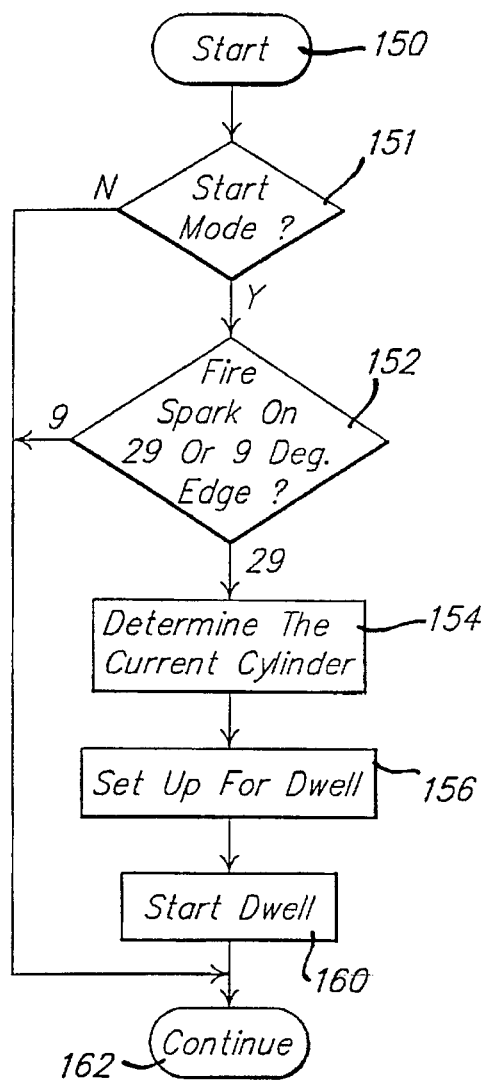

Referring to FIG. 5C, the methodology begins in bubble 150 after being called for by the engine control unit 30 when a predetermined number of degrees BTDC edge such as a 69° BTDC edge is detected and advances to diamond 151. In diamond 151, the methodology determines whether the engine 10 is in a start mode to be described. If not, the methodology advances to bubble 162 to be described. If so, the methodology advances to diamond 152. It should be appreciated that a 69° edge has been chosen for this example, and other positions may be selected. In diamond 152, the methodology determines whether the spark is to be fired on the second or advanced crank reference edge, 29° BTDC in this example, or the normal crank reference edge, 9° BTDC in this example. If the first crank edge is chosen, the methodology advances to bubble 162 to be described. If the second crank edge is chosen, the methodology advances to block 154 and determines which cylinder 12 is firing based on a signal from the crankshaft and camshaft sensors. The methodology then advance to block 156 and sets control flags indicating the dwell period 42 will begin at 69° BTDC. The methodology then advances to block 160 and starts the dwell. The methodology then advances to bubble 162 and continues back to the main program in the engine control unit 30.

Figure 5D:
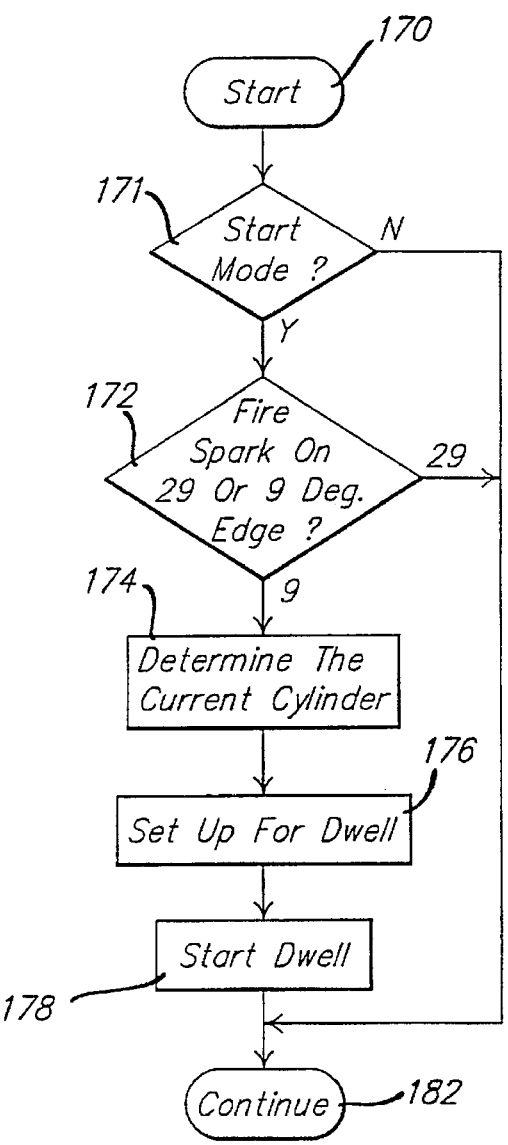

Referring to FIG. 5D, the methodology begins in bubble 170 after being called for by the engine control unit 30 when a predetermined number of degrees BTDC edge such as a 49° BTDC edge is detected and advances to diamond 171. In diamond 171, the methodology determines whether the engine 10 is in a start mode based on engine speed. If not, the methodology advances to bubble 182 to be described. If so, the methodology advances to diamond 172. In diamond 172, the methodology determines whether to fire the spark on this example's second or advanced crank reference edge, 29°, or the first or normal crank reference edge, 9°, based on a control flag. If the second crank edge is chosen, the methodology advances to bubble 182, to be described. If the first crank edge is selected, the methodology advances to block 174 and determines which cylinder 12 is firing based on a predetermined combination of signals from the crankshaft and camshaft sensors. The methodology then advances to block 176 and sets up for the beginning of the dwell period 42. The methodology advances to block 178, and starts or initiates the dwell on the 49° BTDC edge. The methodology then advances to bubble 182 and continues back to the main program in the engine control unit 30.

Figure 5E:
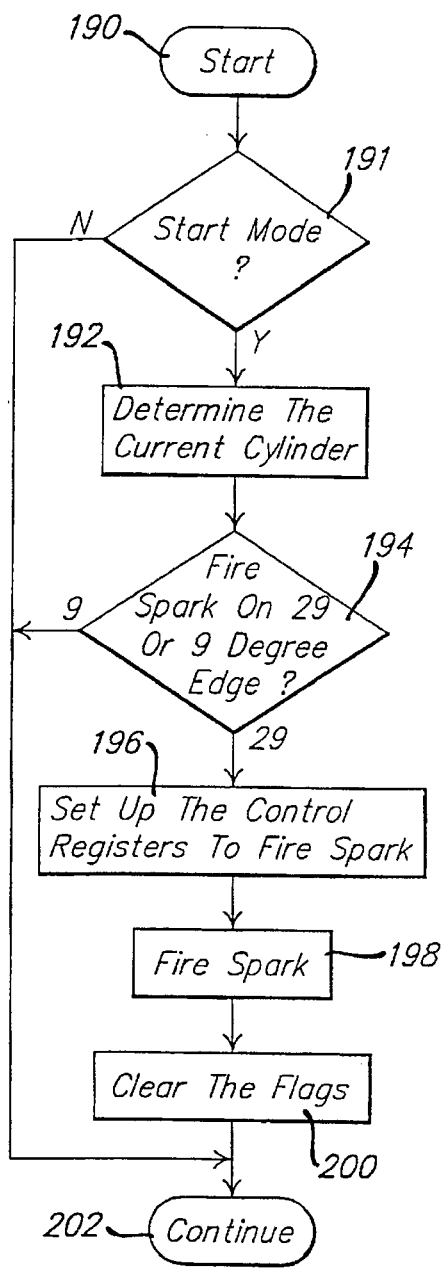

Referring to FIG. 5E, the methodology begins in block 190 after being called for by the engine control unit 30 when a predetermined number of degrees BTDC edge such as the 29° BTDC edge is detected. The methodology advances to diamond 191 and determines whether the engine 10 is in a start mode. The start mode occurs when the engine is keyed ON and the engine revolutions per minute (RPM) are less than a predetermined level, such as 600 rpm. If not, the methodology advances to bubble 202 to be described. If so, the methodology advances to block 192. It should be appreciated that the 29° BTDC edge was selected for this example and that another suitable edge could be used.

In block 192, the methodology determines the current cylinder and advances to diamond 194. In diamond 194, the methodology checks the control flag, and determines whether to fire the spark on the first or normal crank reference edge or the second or advanced crank reference edge. If the first crank reference edge is selected, the methodology advances to bubble 202 to be described. If the second crank reference edge is selected, the methodology advances to block 196 and sets up control registers within memory of the engine control unit 30 to fire the spark. After block 196, the methodology advances to block 198, and fires the spark. The methodology then advances to block 200 and clears flags. The methodology advances then to bubble 202 and continues back to the main program in the engine control unit 30.

Figure 5F:
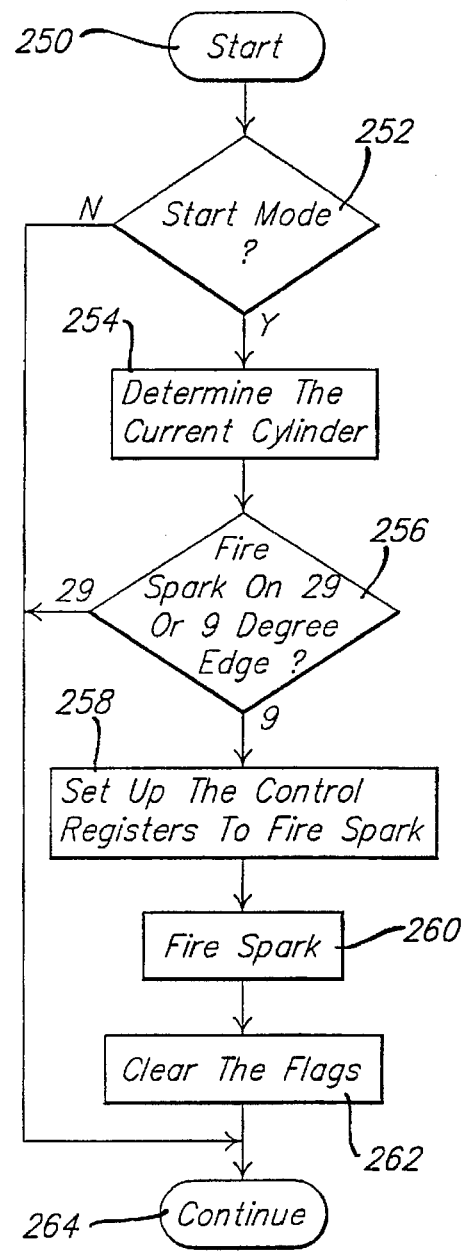

Referring to FIG. 5F, the methodology begins in bubble 250 after being called for by the engine control unit 30 when a predetermined number of degrees BTDC edge such as a 9° BTDC edge is detected. The methodology advances to block 252 and determines whether the engine is still in a start mode. If not, methodology advances to bubble 264 to be described. If so, the methodology advances to block 254. It should be appreciated that the 9° BTDC edge was selected for this example and that another suitable edge could be used.

In block 254, the methodology determines the current cylinder and advances to diamond 256. In diamond 256, the methodology checks the control flag and determines whether to fire the spark on the first or normal crank reference edge, 9°, or the second or second crank reference edge, 29°. If the advanced crank reference edge is selected, the methodology advances to bubble 264 to be described. If the first normal crank reference edge is selected, the methodology advances to block 258 and sets up control registers within the memory of the engine control unit 30 to fire the spark. The methodology then advances to block 260, and fires the spark. The methodology then advances to block 262 and clears the flags. The methodology then advances to bubble 264 and continues back to the main program in the engine control unit 30.

Figure 5G:
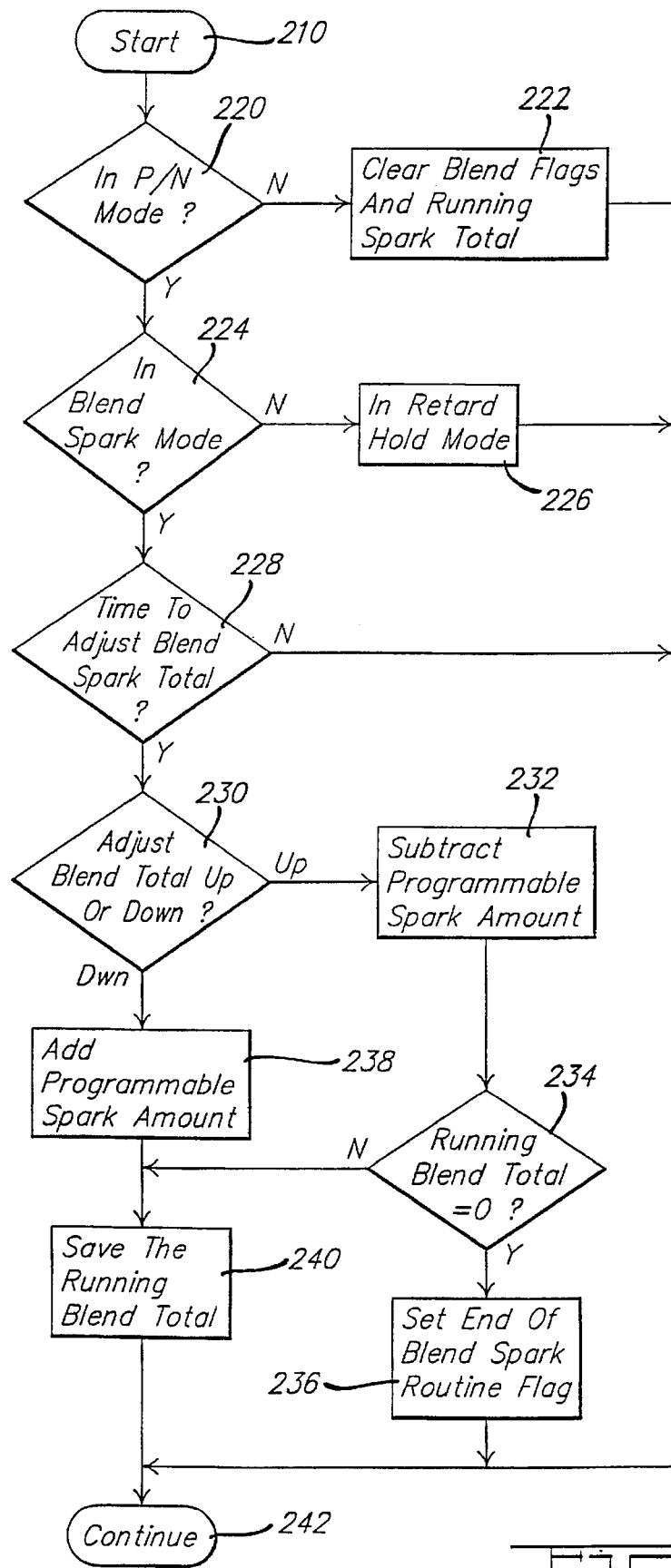

Referring to FIG. 5G, the methodology includes updating the state of the blend-hold-blend and the running spark total. The methodology is called for when a predetermined crank edge, such as the 29° edge in this example, is detected. The methodology begins in bubble 210 and advances to diamond 220.

In diamond 220, the methodology determines whether the transmission is a park or neutral mode by the engine control unit 30 receiving a signal from the park/neutral switch. If the transmission is not in the park or neutral mode, the methodology advances to block 222 and clears the blend flags and running spark total. The methodology then continues to bubble 242 to be described.

In diamond 220, if the transmission is in the park or neutral mode, the methodology advances to diamond 224. In diamond 224, the methodology determines whether the spark advance is in the blending mode. If the spark advance is not in the blending mode, the methodology advances to block 226 and retards the spark advance in a spark retard hold mode. The methodology continues to bubble 242 to be described.

In diamond 224, if the spark advance is in the blending mode, the methodology advances to diamond 228. In diamond 228, the methodology determines whether it is time to adjust the running or blend spark total. The blend spark total is a counter for keeping track of the amount by which the nominal spark should be adjusted each time the methodology is called for. In this example, the running or blend spark total is initialized at zero (0). If not, the methodology advances to bubble 242 to be described. If so, the methodology advances to diamond 230 and determines whether the blend spark total should be adjusted up or down. If the blend spark total should be adjusted up, the methodology advances to block 232 and subtracts a predetermined programmable spark amount from the running or blend spark total. The methodology advances to diamond 234 and determines whether the running or blend spark total is equal to zero (0). If so, the methodology advances to block 236 and set a flag indicating the blend-hold-blend routine has been completed. The methodology advances to bubble 242 to be described. In diamond 234, if the running or blend spark total is not equal to zero, the methodology advances to block 240 to be described.

In diamond 230, if the running or blend spark total should be adjusted down, the methodology advances to block 238 and adds a programmable incremental spark amount to the running or blend spark total. The methodology then advances to block 240 and saves the running or blend spark total indicating the current spark advance in a memory location of the engine control unit 30 until called for. The methodology then advances to bubble 242 and continues back to the main routine in the engine control unit 30.

The present invention has been described in an illustrative manner. It is to be understood that the terminology which has been used is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. A method for advanced crank spark with blend spark retard for an internal combustion engine comprises the steps of:

selecting whether a spark in a cylinder of an internal combustion engine will be fired on one of a group comprising a predetermined first crank edge and a predetermined second crank edge during an engine start mode;

firing the spark on the second crank edge during the engine start mode if the second crank edge is selected;

firing the spark on the first crank edge if the first crank edge is selected;

determining whether the internal combustion engine is in the engine start mode based on engine speed;

continuing to select whether to fire the spark on the one of the group comprising the predetermined first crank edge and the predetermined second crank edge if the internal combustion engine is in the engine start mode based on engine speed less than a predetermined speed; and retarding the spark from a first spark level to a hold spark level at a predetermined rate, holding the spark at the hold spark level for a hold period, and advancing the spark to the first spark level at the predetermined rate, if the internal combustion engine is in the engine start mode based on engine speed greater than the predetermined speed.

2. A method as set forth in claim 1 including the step of:

checking whether a transmission is in one of a group comprising a park mode and a neutral mode;

continuing said method if the transmission is in the one of the group comprising the park mode and the neutral mode; and ending said method if the transmission is not in the one of the group comprising the park mode and the neutral mode.

3. A method as set forth in claim 1 including the step of determining which engine cylinder is in the process of ignition.

4. A method as set forth in claim 1 wherein the step of determining whether to fire the spark on the one of the group comprising the predetermined first crank edge and the predetermined second crank edge comprises the steps of:

selecting the predetermined second crank edge if a coolant temperature is less than a predetermined temperature; and selecting the predetermined first crank edge if the coolant temperature is greater than the predetermined temperature.

5. A method for advanced crank spark with blend spark retard for an internal combustion engine, said method comprising the steps of:

checking whether the engine is in a start mode;

determining whether to fire a spark on one of a group comprising a predetermined first crank edge and a predetermined second crank edge;

deciding whether to fire the spark on the one of the group comprising the predetermined first crank edge and the predetermined second crank edge;

firing the spark if the predetermined second crank edge is decided and firing the spark if the predetermined first crank edge is decided.

6. A method as set forth in claim 5 including the step of:

periodically checking if a transmission is in one of a group comprising a park mode and a neutral mode;

continuing said method if the transmission is in the one of the group comprising the park mode and the neutral mode; and ending said method if the transmission is not in the one of the group comprising the park mode and the neutral mode.

7. A method as set forth in claim 5 including the steps of determining a hold period, and determining a hold spark level.

8. A method as set forth in claim 5 including the steps of:

checking if in one of a group comprising a blending down mode and a blending up mode;

adding an incremental amount to a running total and continuing said method if in the blending down mode; and subtracting the incremental amount from the running total and ending said method if the running total is zero and continuing said method if the running total is not zero, if in the blending up mode.

9. A method as set forth in claim 5 including the step of determining which cylinder is in the process of ignition.

10. A method as set forth in claim 5 wherein said step of determining whether to fire the spark on the one of the group comprising the predetermined first crank edge and the predetermined second crank edge includes:

selecting the predetermined first crank edge if a coolant temperature is less than a predetermined temperature; and selecting the predetermined first crank edge if the coolant temperature is greater than the predetermined temperature.

* * * * *